United States Patent
Kobata (10) Patent No.: US 12,465,157 B2
(45) Date of Patent: Nov. 11, 2025

(54) STAND FOR DROPLET PREVENTION SHEET

(71) Applicant: NEC Platforms, Ltd., Kawasaki (JP)

(72) Inventor: Yuki Kobata, Kanagawa (JP)

(73) Assignee: SteeRetail Co., Ltd., Kawasaki (JP)

( * ) Notice: Subject to any disclaimer, the term of this patent is extended or adjusted under 35 U.S.C. 154(b) by 181 days.

(21) Appl. No.: 18/271,157

(22) PCT Filed: Dec. 8, 2021

(86) PCT No.: PCT/JP2021/045169
§ 371 (c)(1),
(2) Date: Jul. 6, 2023

(87) PCT Pub. No.: WO2022/153732
PCT Pub. Date: Jul. 21, 2022

(65) Prior Publication Data
US 2024/0049894 A1    Feb. 15, 2024

(30) Foreign Application Priority Data

Jan. 13, 2021 (JP) .................... 2021-003340

(51) Int. Cl.
*A47F 9/04* (2006.01)

(52) U.S. Cl.
CPC .......... *A47F 9/04* (2013.01); *A47F 2009/041* (2013.01)

(58) Field of Classification Search
CPC ........ A47F 3/12; A47F 9/04; A47F 2009/041; G07G 1/00
USPC ............................................. 312/137, 140.4
See application file for complete search history.

(56) References Cited

U.S. PATENT DOCUMENTS

| | | | | |
|---|---|---|---|---|
| 1,915,727 A | * | 6/1933 | Friedemann | A47F 5/10 |
| | | | | 248/125.3 |
| 2,150,222 A | * | 3/1939 | Hoffman | A47F 5/08 |
| | | | | 211/1 |
| 3,817,310 A | * | 6/1974 | Petersen | A47F 10/06 |
| | | | | 160/369 |

(Continued)

FOREIGN PATENT DOCUMENTS

| | | |
|---|---|---|
| JP | 2017-084300 A | 5/2017 |
| JP | 3227065 U | 8/2020 |

(Continued)

OTHER PUBLICATIONS

International Search Report for PCT Application No. PCT/JP2021/045169, mailed on Feb. 8, 2022.

(Continued)

*Primary Examiner* — James O Hansen
(74) *Attorney, Agent, or Firm* — Tutunjian & Bitetto, P.C.

(57) ABSTRACT

A stand for a droplet prevention sheet attached to a POS terminal including a body part, a hole part being formed on an upper surface of the body part, the stand including: a stand pole including a pole body part that is extended in a rod-like shape, a first pole end, and a second pole end, the first and the second pole ends being both ends of the pole body part; and a sheet fixing part configured to fix a droplet prevention sheet, the sheet fixing part being coupled to the stand pole, in which the stand pole is vertically disposed in the body part of the POS terminal by the first pole end being fixed to the hole part.

10 Claims, 11 Drawing Sheets

(56) References Cited

U.S. PATENT DOCUMENTS

| | | | | |
|---|---|---|---|---|
| 4,138,000 | A | * | 2/1979 | Hartup ..................... A47F 9/04 |
| | | | | D6/698 |
| 4,620,808 | A | * | 11/1986 | Kurtin ....................... B41J 3/46 |
| | | | | 248/921 |
| 6,834,596 | B2 | * | 12/2004 | Kerber .................... A47F 9/046 |
| | | | | 108/42 |
| 8,740,165 | B2 | * | 6/2014 | O'Kasick ............... F16M 11/10 |
| | | | | 248/276.1 |
| 2006/0175940 | A1 | * | 8/2006 | English ................ A47F 7/0071 |
| | | | | 312/137 |
| 2007/0236112 | A1 | * | 10/2007 | Williman .................. A47F 3/12 |
| | | | | 312/140.4 |
| 2018/0332980 | A1 | | 11/2018 | Nishio |

FOREIGN PATENT DOCUMENTS

| | | |
|---|---|---|
| JP | 3227488 U | 9/2020 |
| JP | 3228215 U | 10/2020 |
| JP | 3230104 U | 1/2021 |

OTHER PUBLICATIONS

English translation of Written opinion for PCT Application No. PCT/JP2021/045169, mailed on Feb. 8, 2022.

\* cited by examiner

STAND FOR DROPLET PREVENTION SHEET

This application is a National Stage Entry of PCT/JP2021/045169 filed on Dec. 8, 2021, which claims priority from Japanese Patent Application 2021-003340 filed on Jan. 13, 2021, the contents of all of which are incorporated herein by reference, in their entirety.

TECHNICAL FIELD

The present invention relates to a stand for a droplet prevention sheet.

BACKGROUND ART

In recent years, infections with viruses have been spreading and becoming a worldwide problem. In order to prevent infections with viruses or the like, it is important to avoid contact with infected people. Further, when an infected person coughs or sneezes, droplets containing pathogens such as viruses are spread. In order to prevent such spread of infectious droplets, measures have been taken to physically prevent the spread of infectious droplets, such as using masks, face shields, and separation panels.

In particular, at cashiers in stores, in order to protect employees from being infected, protective panels and sheets have been installed to separate customers and patients from employees so that air currents between them do not mix. Note that store cashiers generally use Point of Sales (POS) terminals.

Patent Literature 1 discloses a stand apparatus including a movable support pillar so that the stand apparatus can install an apparatus in a room or the like of any size. Further, a droplet prevention apparatus includes a movable separation panel. The droplet prevention apparatus can thereby install the separation panel in a position adapted to an installation environment.

CITATION LIST

Patent Literature

Patent Literature 1: Japanese Utility Model Registration No. 3228215

SUMMARY OF INVENTION

Figure 11:
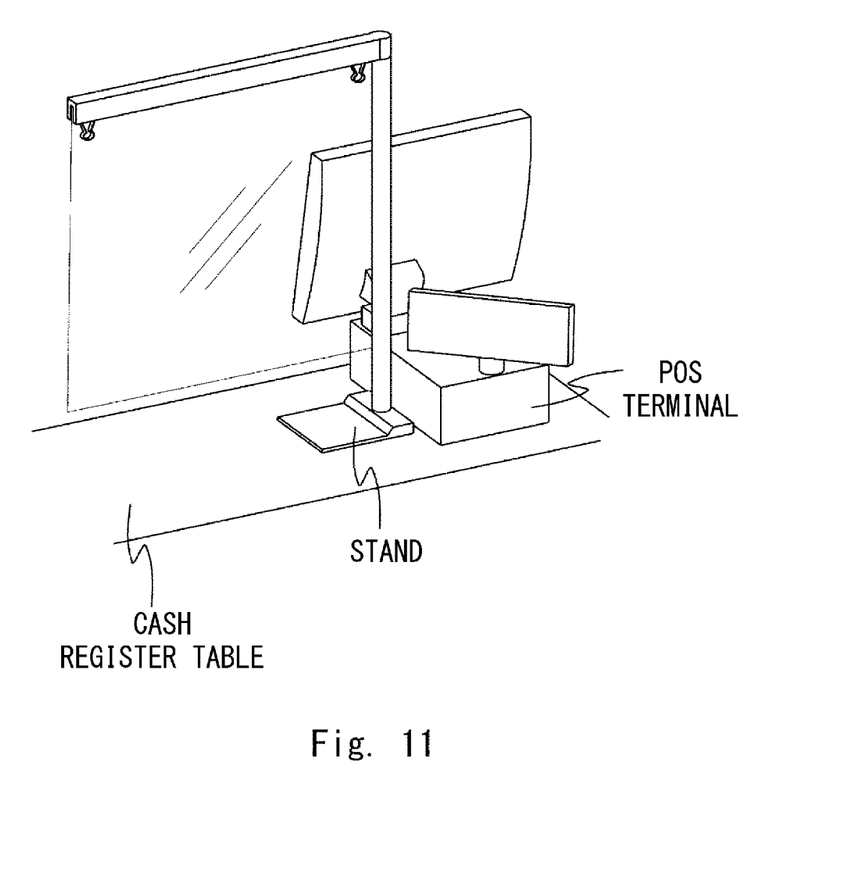
FIG. 11 is a diagram showing a related stand disposed on a cash register table.

However, the most popular method for installing droplet prevention sheets installed in store cashiers is a method for using a stand including a base part as shown in FIG. 11.

That is, a stand base part is placed on a cash register table on which products are placed, and a droplet prevention sheet is vertically attached to a pole that is vertically disposed on the base part so that the droplet prevention sheet separates employees from customers.

Note that, when an external force is applied to the stand, such as when a person comes into contact with the stand, the external force may act as a force that causes the stand to fall. In order to prevent the stand from falling, it is required that the stand base part be in contact with a predetermined area of the cash register table. Therefore, the stand base part has to be formed in a predetermined size.

However, in stores having a limited amount of space, an area of a cash register table is often small and thus it may be difficult to install a stand that includes a base part that is to be placed on the cash register table.

The present disclosure has been made in view of the above-described problem and an object thereof is to provide a stand for a droplet prevention sheet which can be installed in a small space and in which occurrences of falling of the stand due to an external force being applied thereto are prevented or reduced.

A stand according to an example embodiment is a stand for a droplet prevention sheet attached to a POS terminal including a body part, a hole part being formed on an upper surface of the body part, the stand including: a stand pole including a pole body part that is extended in a rod-like shape, a first pole end, and a second pole end, the first and the second pole ends being both ends of the pole body part; and a sheet fixing part configured to fix a droplet prevention sheet, the sheet fixing part being coupled to the stand pole, in which the stand pole is vertically disposed in the body part of the POS terminal by the first pole end being fixed to the hole part.

According to the above structure, it is possible to provide a stand which can be installed in a small space and in which occurrences of falling of the stand due to an external force being applied thereto are prevented or reduced.

EXAMPLE EMBODIMENT

Figure 1:
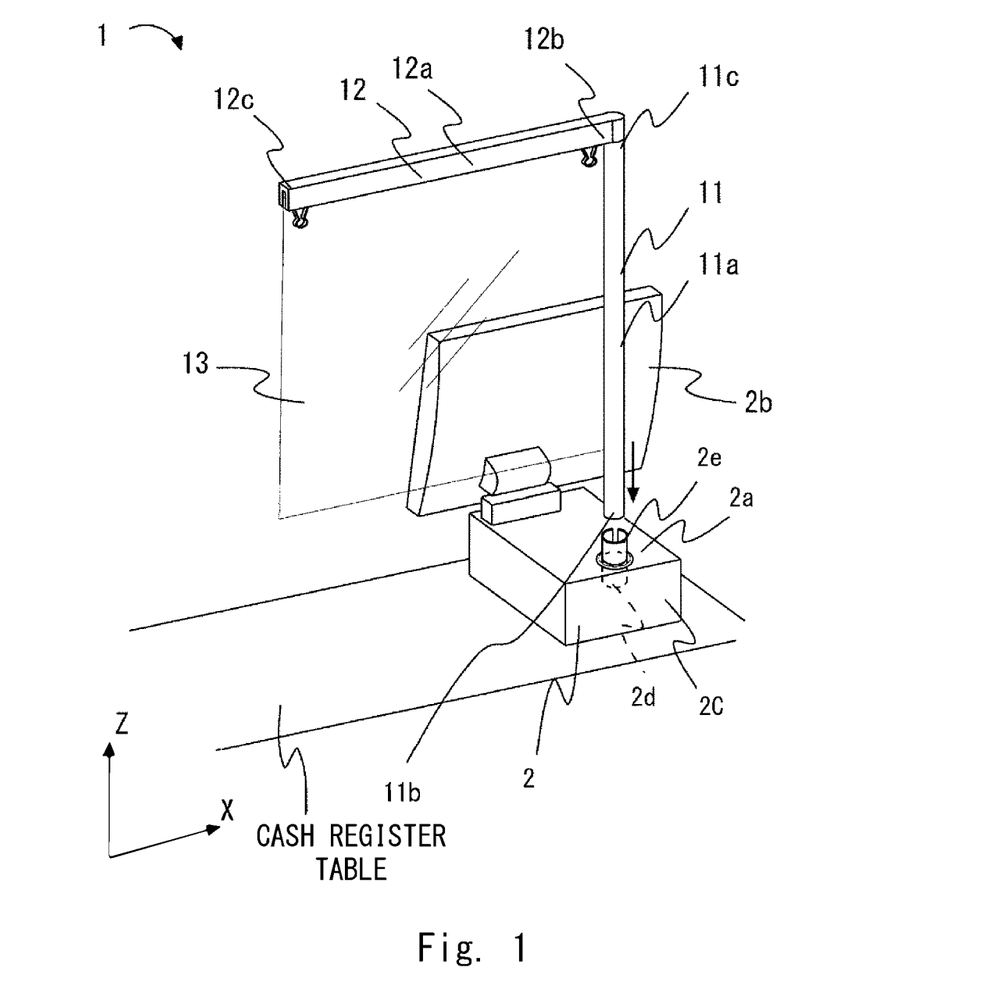
FIG. 1 is a diagram showing a state before a stand pole is fixed to a hole part of a POS terminal.
Figure 2:
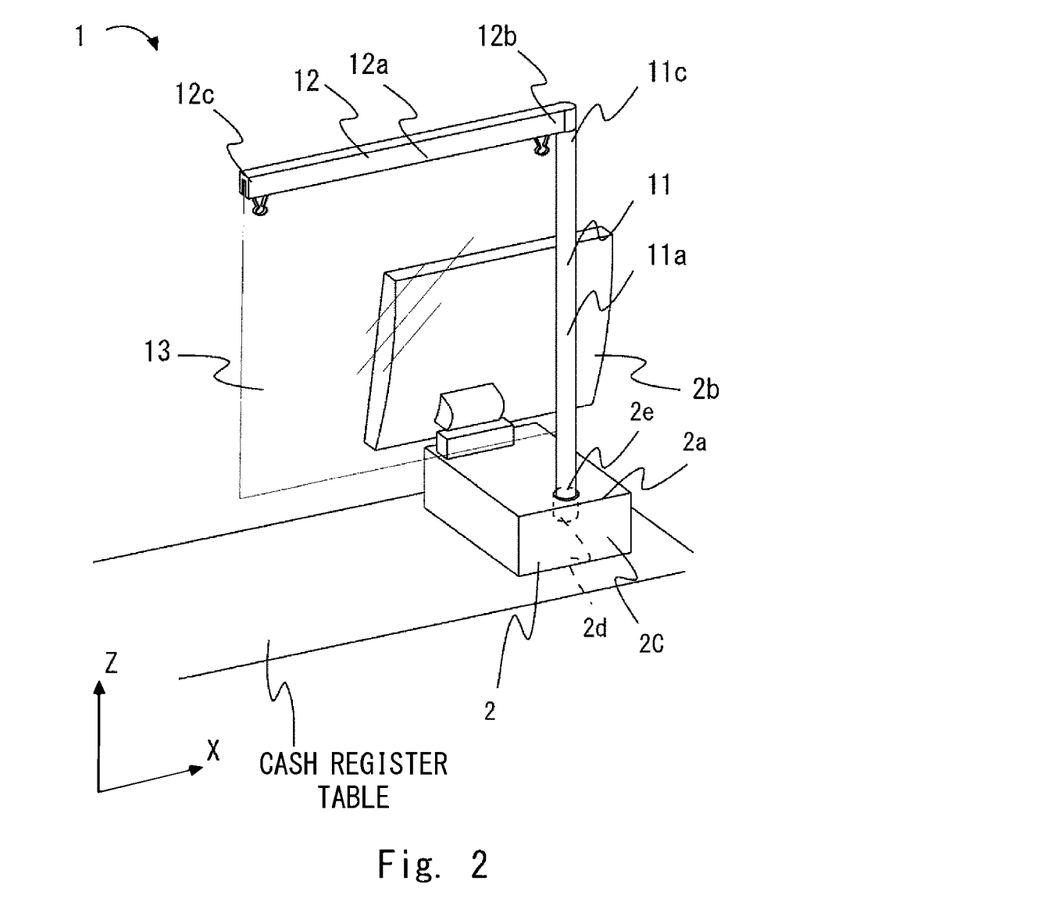
FIG. 2 is a diagram showing a state after the stand pole is fixed to the hole part of the POS terminal.

An example embodiment of the present invention will be described below with reference to the drawings. As shown in FIG. 1, a stand 1 including a stand pole 11 is attached to a POS terminal 2 placed on a cash register table and then used. Note that FIG. 1 shows a state before the stand 1 is attached to the POS terminal 2, while FIG. 2 shows a state in which the stand 1 has been attached to the POS terminal 2.

A description will be given below in accordance with the assumption that the direction in which the stand pole 11 is extended when it is attached to the POS terminal is the Z direction and that other components are also provided in this stand pole 11.

The POS terminal 2 to which the stand 1 is attached will be described with reference to FIG. 1.

The POS terminal 2 includes a body part 2*a* in which a processing apparatus that performs predetermined processing is stored, and a display unit 2*b* for displaying a result of the processing.

The body part 2*a* includes an input part to which a store clerk inputs, a processing unit that performs predetermined calculation processing on a result of the input, and an output unit that outputs a result of the processing of the processing unit by a receipt or the like. The body part 2*a* also includes a box-shaped housing 2*c* storing at least some of these processing units.

A Vacuum Fluorescent Display (VFD) attachment hole (hole part) 2*d* is formed on an upper surface of the housing 2*c*. As an example, the VFD attachment hole 2*d* is formed so that it is seen to have, when the housing 2*c* of the body part 2*a* is viewed from the top thereof, a circular shape and has a predetermined depth from the upper surface of the housing 2*c*.

For example, the predetermined depth of the VFD attachment hole 2*d* is a depth that can maintain the state in which the stand pole 11 is vertically disposed relative to the body part 2*a* of the POS terminal 2 when the stand pole 11 is fixed to the VFD attachment hole 2*d* as described later.

Note that, as shown in FIG. 1, a mount member 2*e* having a cylindrical shape, which is provided so that it protrudes upwardly from the upper surface of the housing 2*c*, may be attached to the VFD attachment hole 2*d*. Meanwhile, it is not necessary to use the mount member 2*e*, and FIG. 2 shows a state in which the stand 1 is attached to the VFD attachment hole without using the mount member 2*e*.

Next, an example of components of the stand 1 will be described.

The stand 1 includes the stand pole 11 and a sheet fixing part 12 which is coupled to the stand pole 11 and fixes a droplet prevention sheet 13. Note that the droplet prevention sheet 13 is a sheet having a rectangular surface of a predetermined size.

The stand pole 11 includes a pole body part 11*a* that is extended in a rod-like shape, and a first pole end 11*b* and a second pole end 11*c* which are both ends of the pole body part. A description will be given below in accordance with the assumption that the pole body part 11*a* has a cylindrical shape.

As shown in FIG. 2, the stand pole 11 is attached to the VFD attachment hole 2*d* of the housing 2*c* of the POS terminal 2 and is vertically disposed. Note that a description will be given below in accordance with the assumption that the mount member 2*e* is not used and the stand pole 11 is inserted into the VFD attachment hole 2*d* and fixed.

In the stand pole 11, the first pole end 11*b* is inserted into the VFD attachment hole 2*d* of the POS terminal 2 in a state in which the pole body part 11*a* having a rod-like shape is extended in the vertical direction. By this structure, the stand pole 11 is vertically disposed in the body part 2*a* of the POS terminal 2.

In this case, the first pole end 11*b* provided in the stand pole 11 is formed so as to have a diameter equal to that of a pole part 3*b* of a VFD apparatus 3 described later so that the first pole end 11*b* can be inserted into the VFD attachment hole 2*d*.

Figure 3:
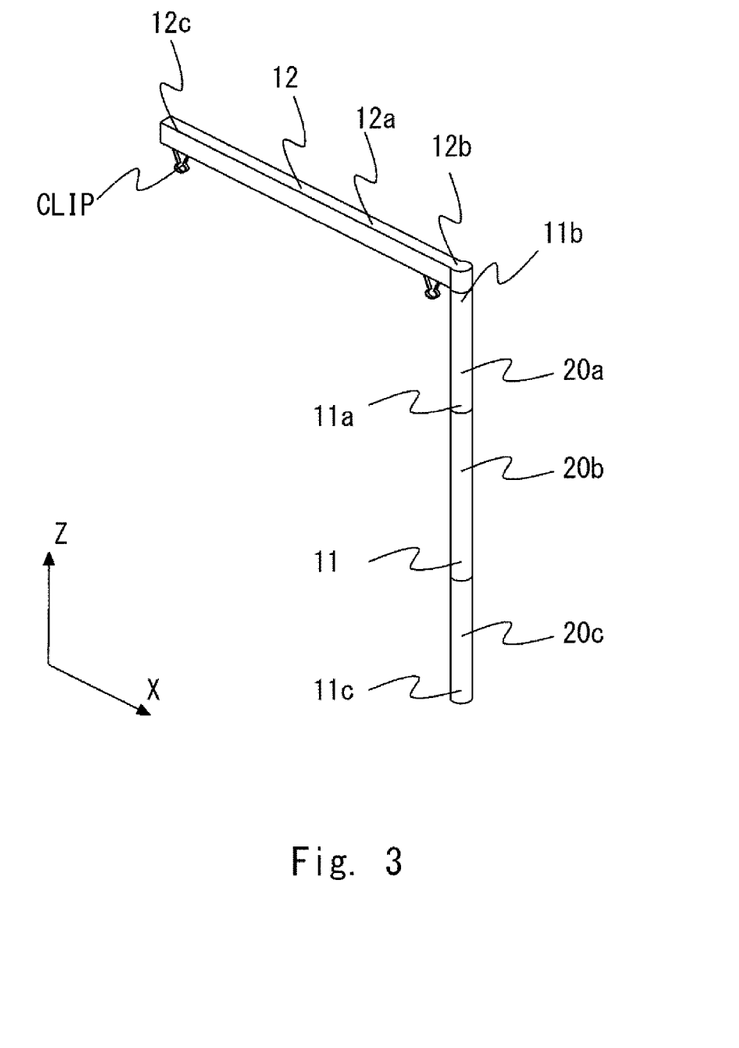
FIG. 3 is a diagram showing a state in which a sheet fixing part is coupled to the stand pole.

Note that, as shown in FIG. 3, the stand pole 11 may be formed by combining a plurality of short cylindrical pole components 20*a*, 20*b*, and 20*c*. When the pole body part 11*a* is formed by combining the pole components as described above, the length of the stand pole 11 can be easily changed.

Figure 4:
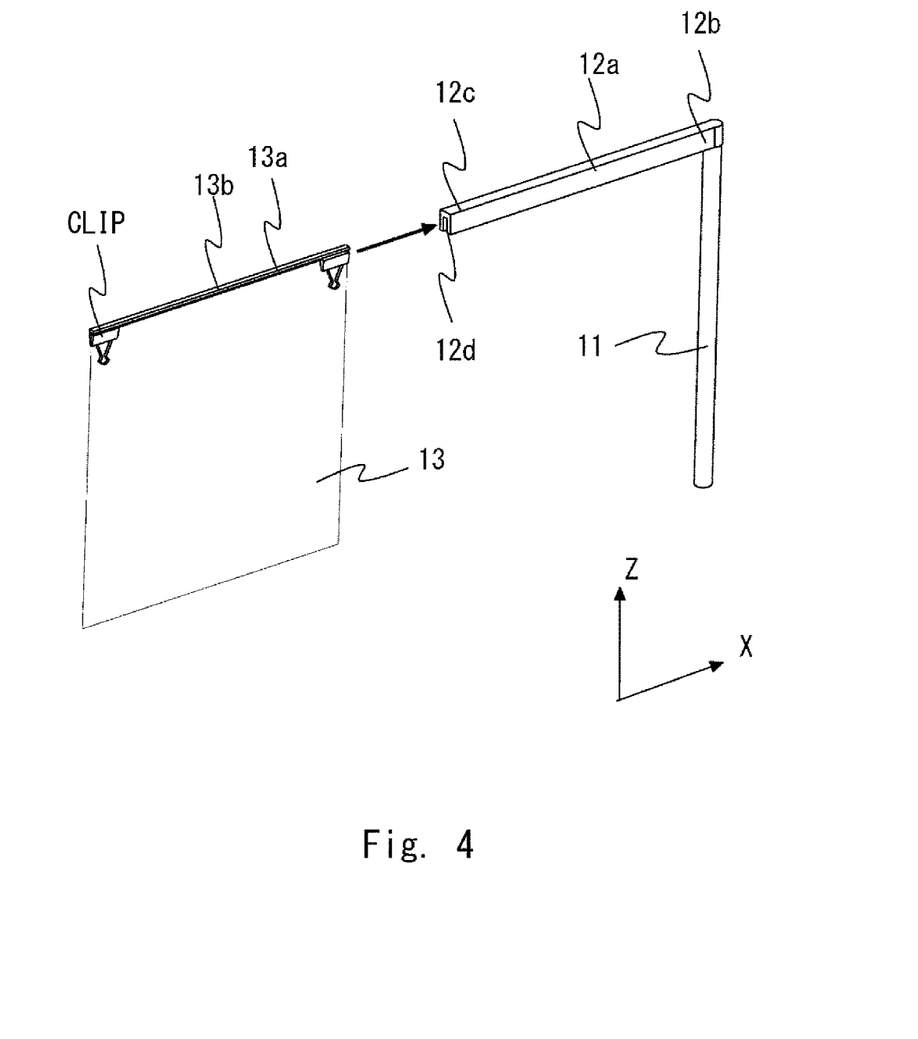
FIG. 4 is a diagram showing a state in which a droplet prevention sheet is inserted into a sheet fixing part using a rail.

As shown in FIGS. 3 and 4, the sheet fixing part 12 includes a sheet fixing body part 12*a* having a shape that is extended in a predetermined direction, a first fixing part end 12*b* that is the first pole end, and a second fixing part end 12*c*. The first and second fixing part ends 12*b* and 12*c* are both ends of the sheet fixing body part 12*a*.

The first fixing part end 12*b* of the sheet fixing part 12 is coupled to the second pole end 11*c* of the stand pole 11. At this time, the direction in which the sheet fixing body part 12*a* is extended is a direction perpendicular to the pole body part 11*a*. In the following description, it is assumed that the direction in which the sheet fixing body part 12*a* is extended is the X direction.

As shown in FIG. 4, in the sheet fixing part 12, a fixing-part-side rail component 12*d* having a shape that is extended in the X direction. For example, the fixing-part-side rail component 12*d* is recessed upwardly from a lower surface of the sheet fixing body part 12*a* so that it can support, when a sheet-side rail component 13*b*, which will be described later, is inserted into the above recess, a part of the sheet-side rail component 13*b* from below and then suspend it.

Figure 5:
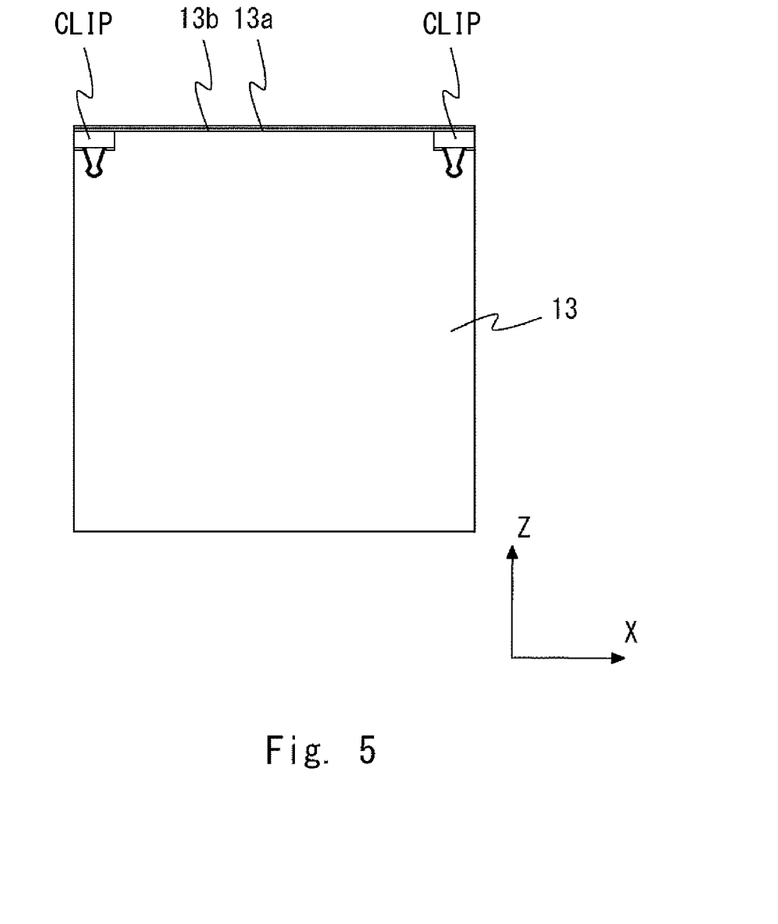
FIG. 5 is a diagram showing an example of a droplet prevention sheet.

Note that the droplet prevention sheet 13 includes a rectangular surface. As shown in FIG. 5, a plurality of sheet-side rail components 13*b* that can be inserted into the fixing-part-side rail component 12*d* of the sheet fixing body part 12*a* are attached to an upper side 13*a* of the rectangular surface of the droplet prevention sheet 13. For example, clips can be used to connect the sheet-side rail components 13*b* to the droplet prevention sheet 13.

Referring back to FIG. 4, the sheet-side rail components 13*b* attached to the droplet prevention sheet 13 can be inserted into the fixing-part-side rail component 12*d* from the second fixing part end 12*c*. Further, the sheet-side rail components 13*b* can be slid in the X direction while being engaged with the fixing-part-side rail component 12*d*.

As an example, the fixing-part-side rail component 12*d* is an outer member in which a plurality of balls are disposed, while the sheet-side rail component 13*b* is an inner member in which ball retainers are provided so as to come into contact with the balls.

By the above structure, the droplet prevention sheet 13 is installed in the sheet fixing part 12. Typically, a worker can fix the droplet prevention sheet 13 to the sheet fixing part 12 after sliding the droplet prevention sheet 13 to a desired position.

Note that a method for installing the droplet prevention sheet 13 in the sheet fixing part 12 is not limited to a method using a rail by the combination of the fixing-part-side rail component 12*d* and the sheet-side rail component 13*b*.

For example, the droplet prevention sheet 13 can be inserted into the sheet fixing body part 12*a* and the surface of the droplet prevention sheet 13 can be clamped and fixed.

Figure 7:
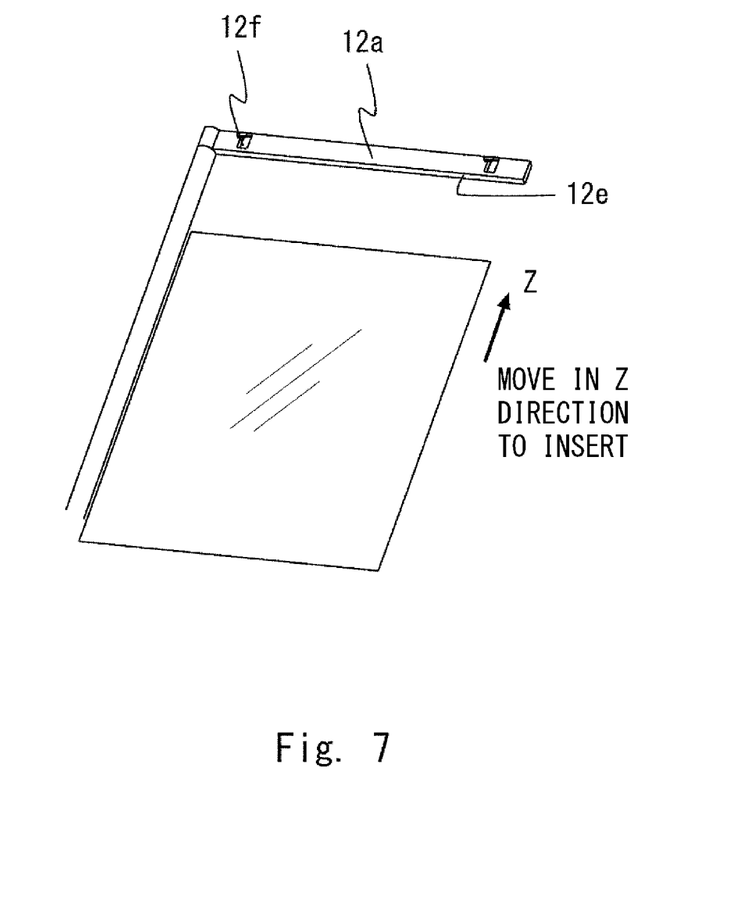
FIG. 7 is a diagram showing a state in which a droplet prevention sheet is inserted into a sheet fixing part including a groove part.

Specifically, as shown in FIG. 7, a groove part 12*e*, which is extended in the X direction and recessed upwardly, is formed on the lower surface of the sheet fixing body part 12*a*. In other words, the groove part 12*e* can have a shape which is long in the direction in which the sheet fixing body part 12*a* is extended and which is recessed in a direction perpendicular to the direction in which the sheet fixing body part 12*a* is extended.

Further, a claw part 12*f* that clamps the surfaces of the droplet prevention sheet 13 inserted in the groove part 12*e* is formed in the sheet fixing part 12.

In such a structure, as shown in FIG. 7, the upper side 13a of the droplet prevention sheet 13 is made to face the lower surface of the sheet fixing body part 12a and the droplet prevention sheet 13 is raised, whereby the upper side 13a can be inserted into the groove part 12e.

Figure 6:
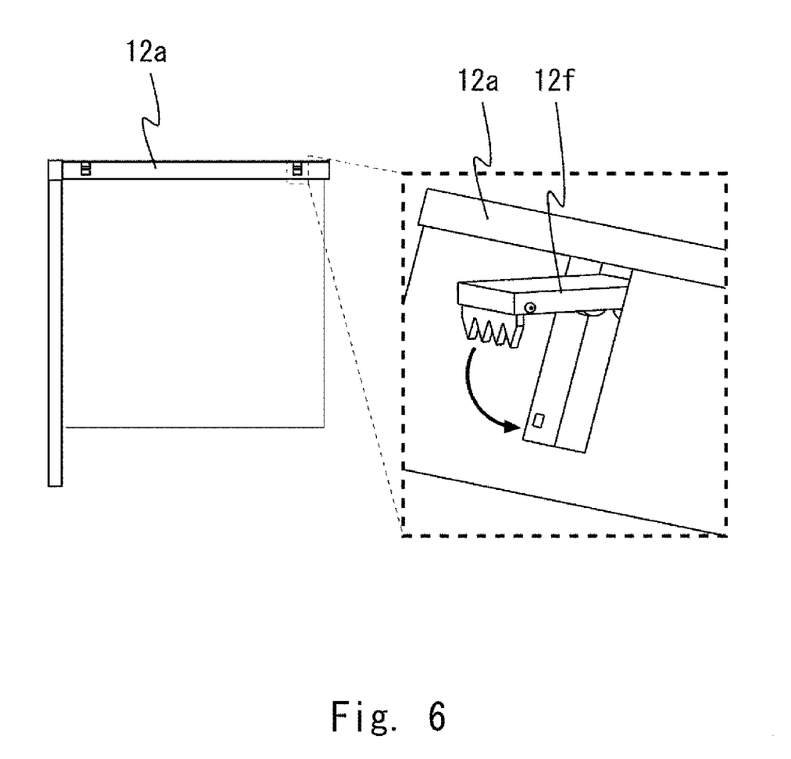
FIG. 6 is a diagram showing a claw part that fixes a droplet prevention sheet inserted into a sheet fixing part including a groove part.

Further, as shown in FIG. 6, the droplet prevention sheet 13 can be fixed by the claw part 12f clamping the surfaces of the droplet prevention sheet 13 inserted into the groove part 12e.

Further, as another method for fixing the droplet prevention sheet 13 to the sheet fixing part 12, a clip that protrudes downwardly from the sheet fixing body part 12a may be provided in advance as shown in FIG. 3, and the droplet prevention sheet 13 may be attached to this clip.

Figure 8:
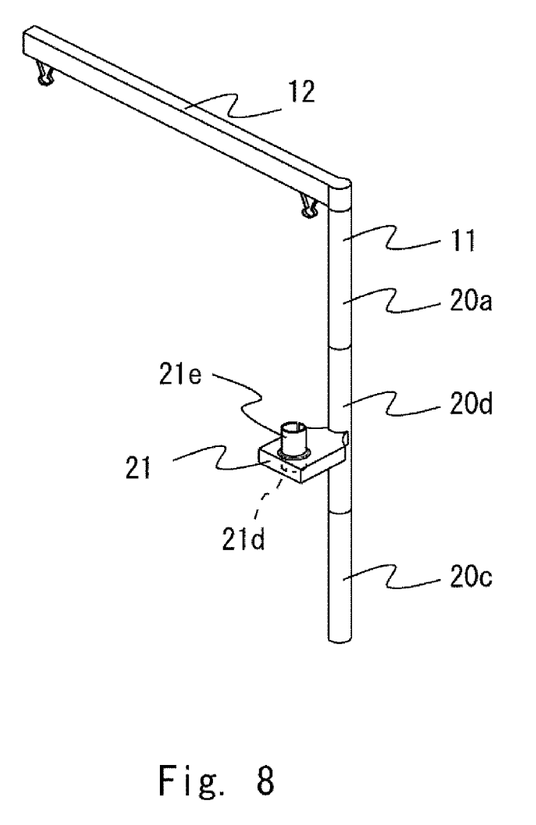
FIG. 8 is a diagram showing a state in which a pedestal on which a VFD apparatus is to be placed is provided in a stand pole.
Figure 9:
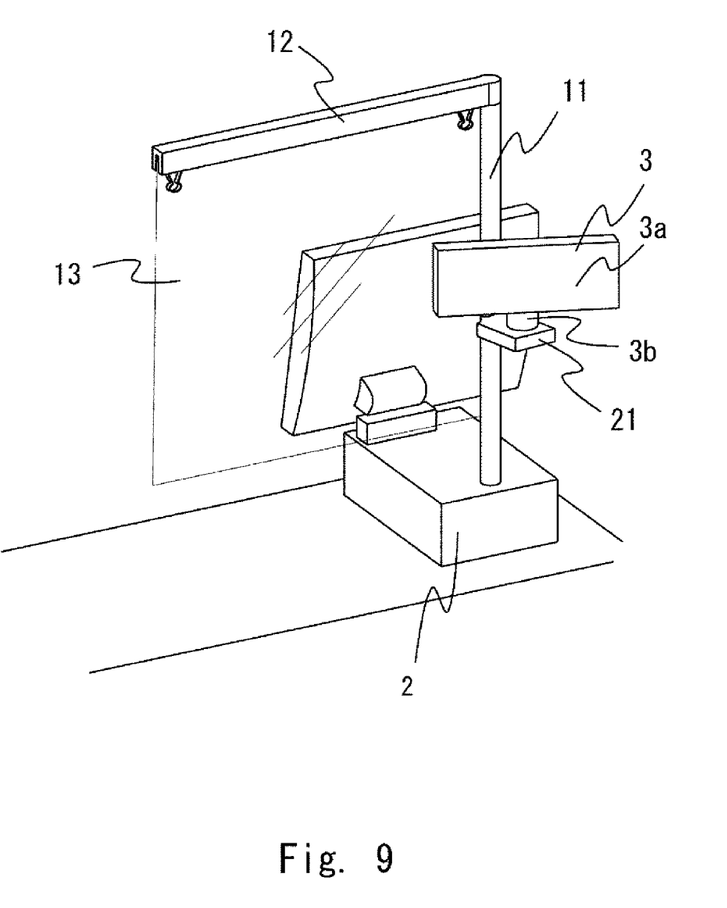
FIG. 9 is a diagram showing a state in which a plurality of sheet fixing parts are coupled to a stand pole.

Further, as shown in FIGS. 8 and 9, a pedestal 21 on which the VFD apparatus is to be placed can be provided in the pole body part 11a of the stand pole 11.

On the upper surface of the pedestal 21, a hole part 21d is formed so as to have a diameter equal to that of the VFD attachment hole 2d of the housing 2c of the POS terminal 2.

Note that, as shown in FIG. 9, the VFD apparatus 3 includes a display unit 3a and the pole part 3b that protrudes downwardly from the display unit. In the pedestal 21, the VFD apparatus 3 is fixed by inserting the pole part 3b into the hole part 21d.

As shown in FIG. 8, the pedestal 21 can be implemented by incorporating a pole component 20d in which the pedestal 21 is provided into the pole body part 11a. As an example, by replacing the pole component 20b with the pole component 20d in which the pedestal 21 is provided, the pedestal 21 can be provided in the pole body part 11a of the stand pole 11.

Typically, the pedestal 21 is provided so that it protrudes from the pole body part 11a in a direction perpendicular to the direction in which the pole body part 11a is extended. Note that the direction in which the pedestal 21 protrudes can be changed, and the position of the pedestal 21 in the Z direction can be set to a position where a person can easily check the display unit 3a when the VFD apparatus 3 is provided on the pedestal 21.

Further, as shown in FIG. 8, a mount member 21e can be provided in the hole part 21d. In this case, the pole part 3b can be connected to the mount member 21e to fix the VFD apparatus 3 on the pedestal 21.

Figure 10:
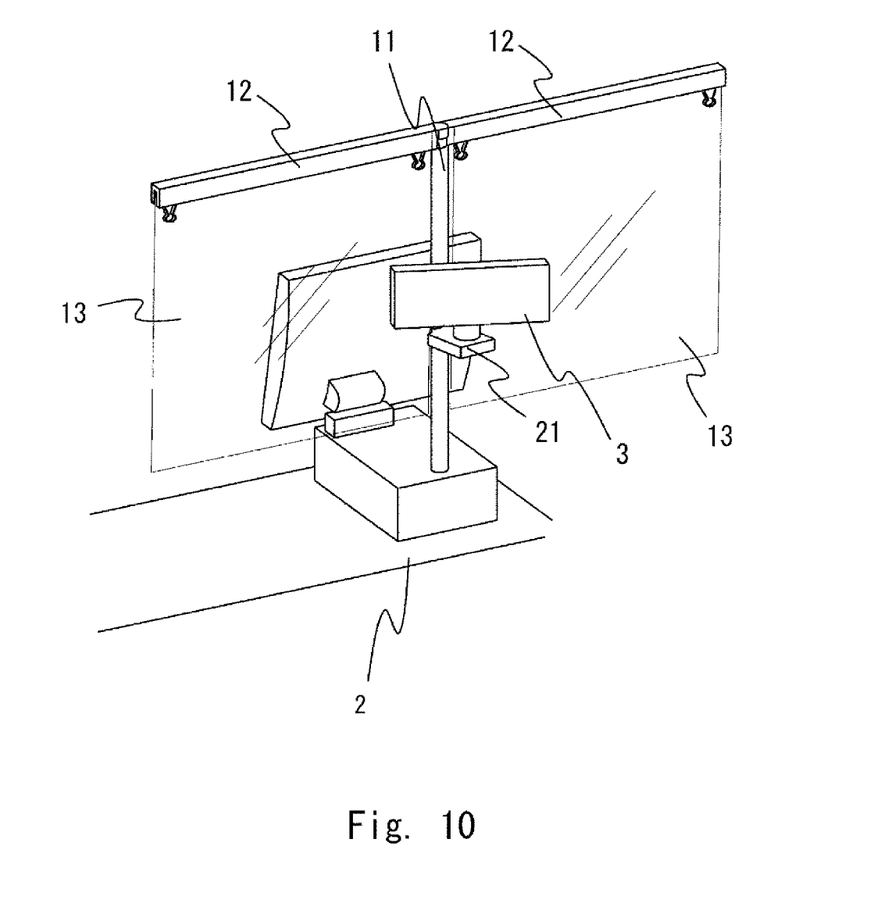
FIG. 10 is a diagram showing a state in which a plurality of sheet fixing parts are coupled to a stand pole and a VFD apparatus is placed on a pedestal.

Further, as shown in FIG. 10, a plurality of sheet fixing parts 12 can be coupled to the stand pole 11. More specifically, FIG. 10 shows an example in which two droplet prevention sheets 13 are disposed so as to sandwich the stand pole 11 therebetween by using the two respective sheet fixing parts 12.

In this case, it is possible to couple the ends of the two sheet fixing parts 12 to the second pole end 11c of the stand pole 11 and arrange them so as to be extended in a direction opposite to each other, and to fix the droplet prevention sheet 13 to each of them. In other words, one of the droplet prevention sheets 13 can be attached to each of the left and right sides of the stand pole 11 attached to the POS terminal 2.

Further, as shown in FIG. 10, it is possible to provide the pedestal 21 for attaching the VFD apparatus 3 to the stand pole 11 in which two sheet fixing parts 12 are provided.

Note that, as a typical usage, when the droplet prevention sheet 13 is required, the VFD apparatus 3 can be removed from the VFD attachment hole 2d of the housing 2c of the POS terminal 2 and the stand 1 can be attached thereto.

On the other hand, when the droplet prevention sheet 13 is not required, the stand 1 can be removed from the VFD attachment hole 2d of the housing 2c of the POS terminal 2 and the VFD apparatus 3 can be attached thereto.

By attaching the stand 1 to the POS terminal 2 in this way, it is not required to dispose the pedestal of the stand 1 on the cash register table. Therefore, it is not required to expand the area of the cash register table in order to provide the stand 1, and the cash register table can be used widely. Further, because of the weight of the POS apparatus 4, the stand 1 is less likely to fall even when an external force is applied to the stand 1, such as when a person comes into contact with the stand 1 or the droplet prevention sheet 13.

Note that the present invention is not limited to the above-described example embodiment and may be changed as appropriate without departing from the scope and spirit of the present invention.

Although a description has been given in accordance with the assumption that, for example, the sheet fixing part 12 is coupled to the second pole end 11c of the stand pole 11 when the sheet fixing part 12 is coupled to the stand pole 11, the present disclosure is not limited thereto. That is, the sheet fixing part 12 may be coupled to a place other than the end of the stand pole 11.

Further, although a description has been given in accordance with the assumption that the direction in which the sheet fixing body part 12a is extended is a direction perpendicular to the pole body part 11a, any direction different from the direction in which the pole body part 11a is extended can be used.

Although the present invention has been described above with reference to an example embodiment, the present invention is not limited to the above-described example embodiment. Various changes that can be understood by those skilled in the art can be made to the configuration and details of the present invention within the scope of the invention.

This application is based upon and claims the benefit of priority from Japanese patent application No. 2021-003340, filed on Jan. 13, 2021, the disclosure of which is incorporated herein in its entirety by reference.

REFERENCE SIGNS LIST

1 STAND
2 POS TERMINAL
2a BODY PART
2b DISPLAY UNIT
2c HOUSING
2d VFD ATTACHMENT HOLE (HOLE PART)
2e MOUNT MEMBER
3 VFD APPARATUS
3a DISPLAY UNIT
3b POLE PART
11 STAND POLE
11a POLE BODY PART
11b FIRST POLE END
11c SECOND POLE END
12 SHEET FIXING PART
12a SHEET FIXING BODY PART
12b FIRST FIXING PART END
12c SECOND FIXING PART END
12d FIXING-PART-SIDE RAIL COMPONENT
12e GROOVE PART
12f CLAW PART
13 DROPLET PREVENTION SHEET
13a UPPER SIDE
13b SHEET-SIDE RAIL COMPONENT
21 PEDESTAL

What is claimed is:

1. A stand for a droplet prevention sheet attached to a POS terminal comprising a body part, a hole part being formed on an upper surface of the body part, the stand comprising:
- a stand pole comprising a pole body part that is extended in a rod-like shape, a first pole end, and a second pole end, the first and the second pole ends being both ends of the pole body part; and
- a sheet fixing part configured to fix a droplet prevention sheet, the sheet fixing part being coupled to the stand pole,
- wherein the stand pole is vertically disposed in the body part of the POS terminal by the first pole end being fixed to the hole part, and
- wherein the sheet fixing part extends horizontally from the stand pole, and the droplet prevention sheet is suspended from the sheet fixing part with an upper end of the droplet prevention sheet being fixed to the sheet fixing part.

2. The stand according to claim 1, wherein
- the hole part formed on the upper surface of the body part of the POS terminal is a hole part to which a fluorescent display tube is able to be attached, and
- instead of the fluorescent display tube being attached to the hole part, the first pole end of the stand pole is fixed to the hole part, and the stand pole is vertically disposed in the body part of the POS terminal.

3. The stand according to claim 1, wherein
- the sheet fixing part comprises a sheet fixing body part that is extended horizontally, a first fixing part end, and a second fixing part end, the first and the second fixing part ends being both ends of the sheet fixing body part, and
- the first fixing part end is coupled to the stand pole.

4. The stand according to claim 3, wherein the first fixing part end of the sheet fixing body part is coupled to the second pole end.

5. The stand according to claim 3, wherein the sheet fixing body part is coupled to the stand pole in a state in which the sheet fixing body part is extended in a direction perpendicular to a direction in which the pole body part is extended.

6. The stand according to claim 3, wherein
- a sheet-side rail component is provided in the droplet prevention sheet,
- the sheet fixing body part comprises a fixing-part-side rail component capable of sliding when the sheet-side rail component is inserted, and
- the sliding performed by the fixing-part-side rail component and the sheet-side rail component makes it possible to attach the droplet prevention sheet to the sheet fixing part.

7. The stand according to claim 3, wherein the sheet fixing body part comprises:
- a recessed part that is long in a direction in which the sheet fixing body part is extended, the recessed part being recessed in a direction perpendicular to the direction in which the sheet fixing body part is extended, and a part of the droplet prevention sheet being insertable into the recessed part; and
- a claw part configured to clamp both surfaces of the droplet prevention sheet inserted into the recessed part to thereby fix the droplet prevention sheet.

8. The stand according to claim 1, wherein a pedestal on which a fluorescent display tube is able to be placed is coupled to the pole body part.

9. The stand according to claim 1, wherein the sheet fixing part and another sheet fixing part configured to fix another droplet prevention sheet are connected to the stand pole.

10. The stand according to claim 1, wherein the stand pole is formed by a combination of a plurality of components for a pole body.

* * * * *